United States Patent [19]
Sarracino et al.

[11] 3,722,775
[45] Mar. 27, 1973

[54] EQUIPMENT FOR LAYING OR RECOVERING SUBMARINE CABLES

[75] Inventors: Marcello Sarracino, Milan; Antonio Ferrintino, Monza; Andrea Borroni, Carimate, all of Italy

[73] Assignee: Industries Pirelli Societa per Azioni, Milan, Italy

[22] Filed: Feb. 4, 1972

[21] Appl. No.: 223,687

[30] Foreign Application Priority Data

Feb. 12, 1971    Italy.................................20455 A/71

[52] U.S. Cl. ..................226/100, 226/108, 226/184, 226/183, 226/187, 226/188, 61/72.3
[51] Int. Cl. ...........................................B65h 17/22
[58] Field of Search......226/100, 108, 184, 183, 187, 226/188; 61/72.3

[56] References Cited

UNITED STATES PATENTS

| | | | |
|---|---|---|---|
| 3,669,329 | 6/1972 | Blanchet | 226/108 |
| 3,658,222 | 4/1972 | Dressel | 226/108 |
| 3,506,174 | 4/1970 | Shuey, Jr. | 226/108 |
| 2,996,231 | 8/1961 | Gretter | 226/108 |
| 2,765,905 | 10/1956 | Sandford | 226/108 |

*Primary Examiner*—Allen N. Knowles
*Attorney*—Lorimer P. Brooks et al.

[57] ABSTRACT

Apparatus for laying or recovering a submarine cable in which the cable is fed to or from a storage device by a pair of drive pulleys intermediate the storage device and a pulley for guiding the cable into the water, such pulleys rotating in planes at an angle to each other, having braking and hydraulic motor units for braking or driving them and being mounted on a frame permitted slight oscillating movement in the direction of the cable laying. Pressure wheels maintain the cable in the driving pulley races, and the cable extends from the storage device to and part way around the drive pulley farther from the storage device, then to and part way around the other drive pulley and then to the guide pulley. The braking units are water cooled and air operated and a hydraulic system controls the hydraulic motors. A dynamometer measures the pulley supporting frame movement, and instrumentation for indicating cable tension, speed and movement and braking pressure is included.

24 Claims, 12 Drawing Figures

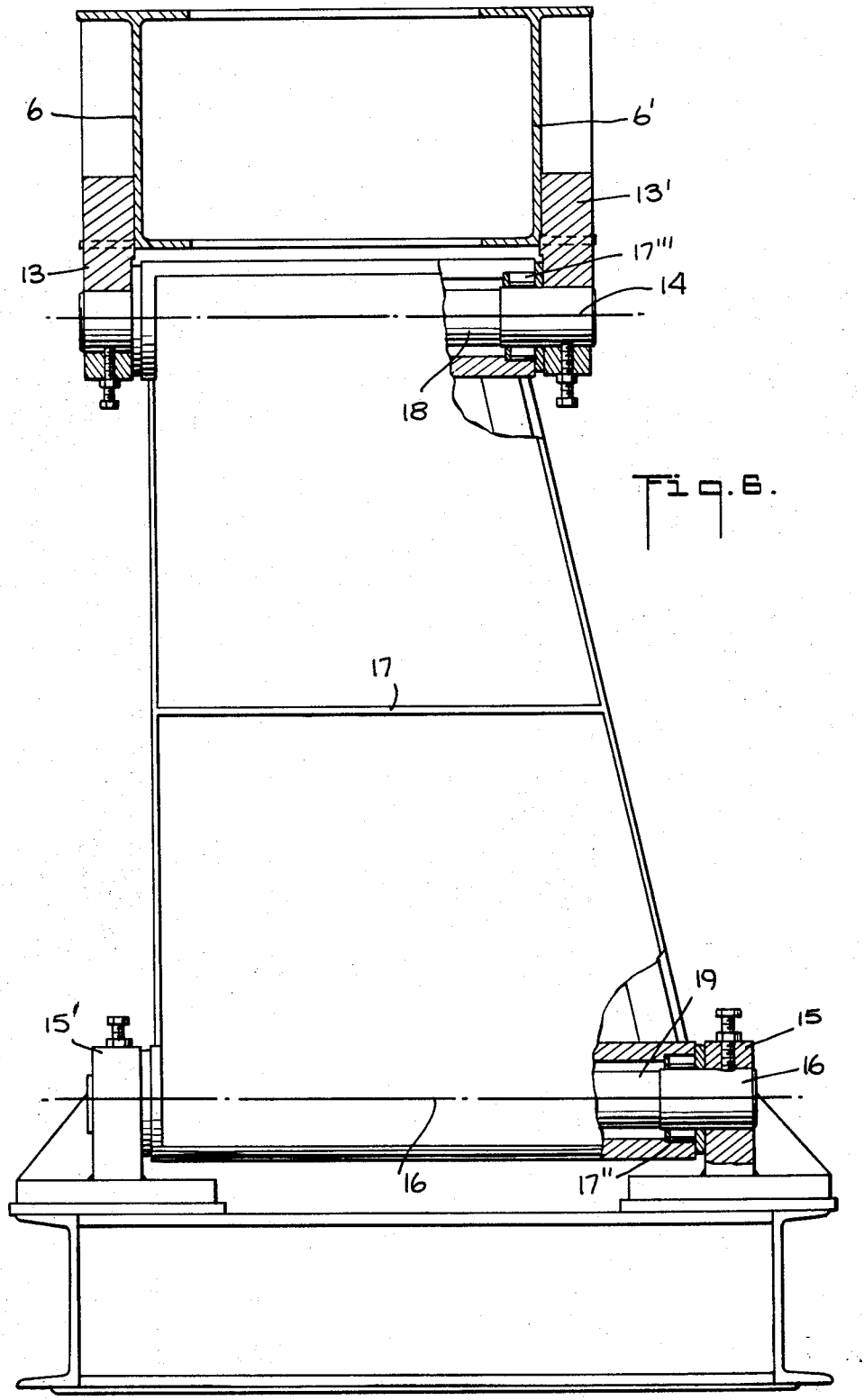

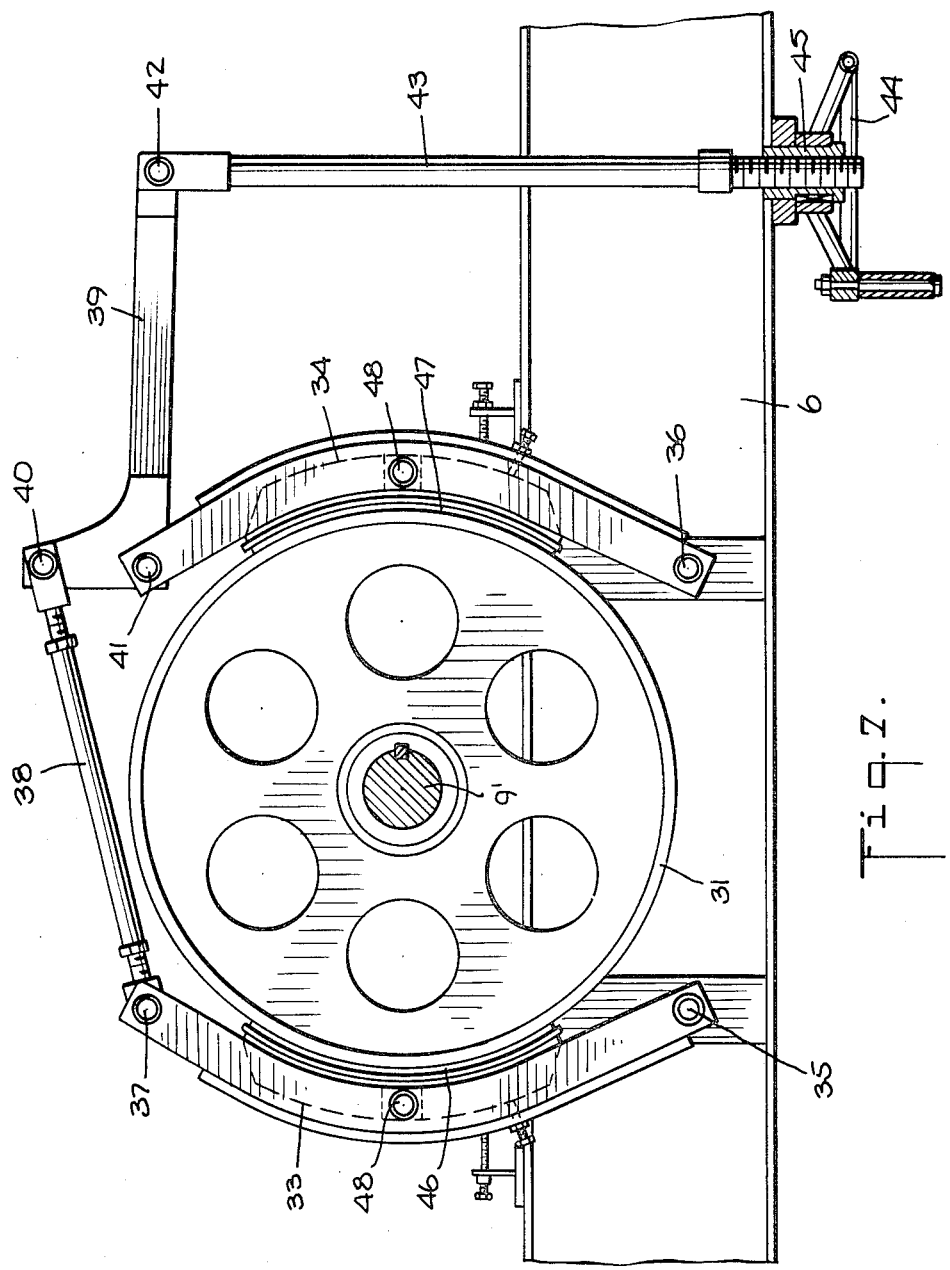

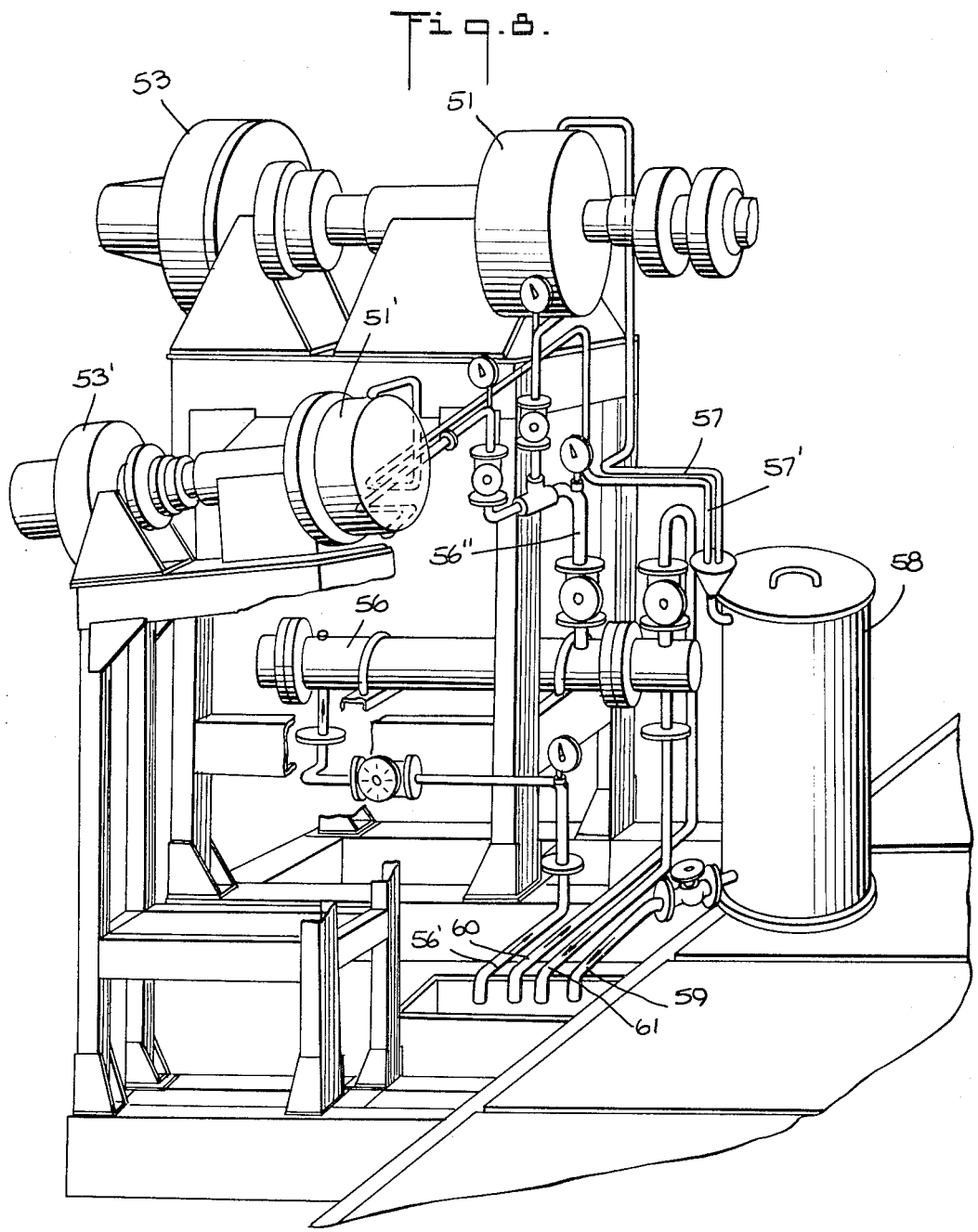

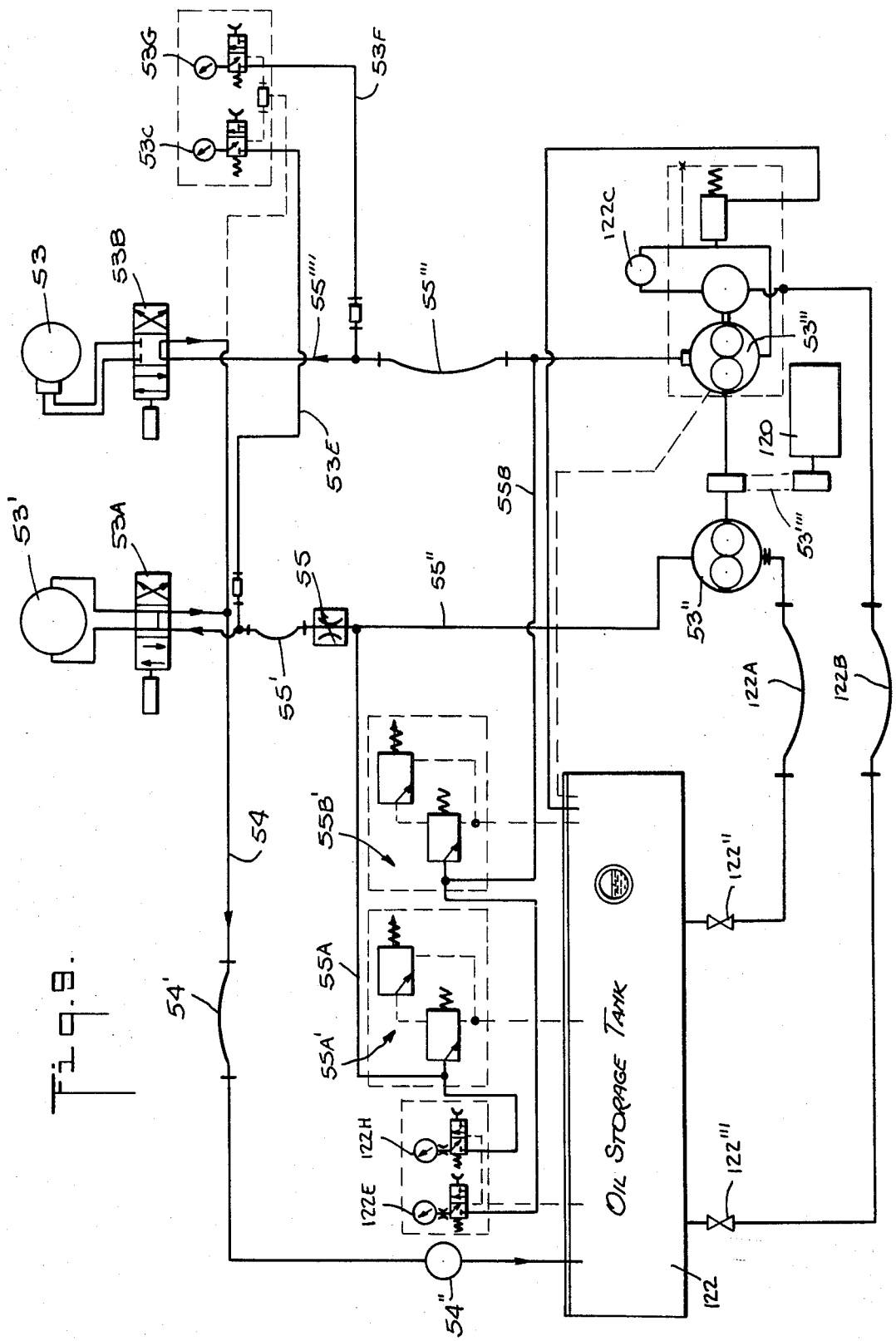

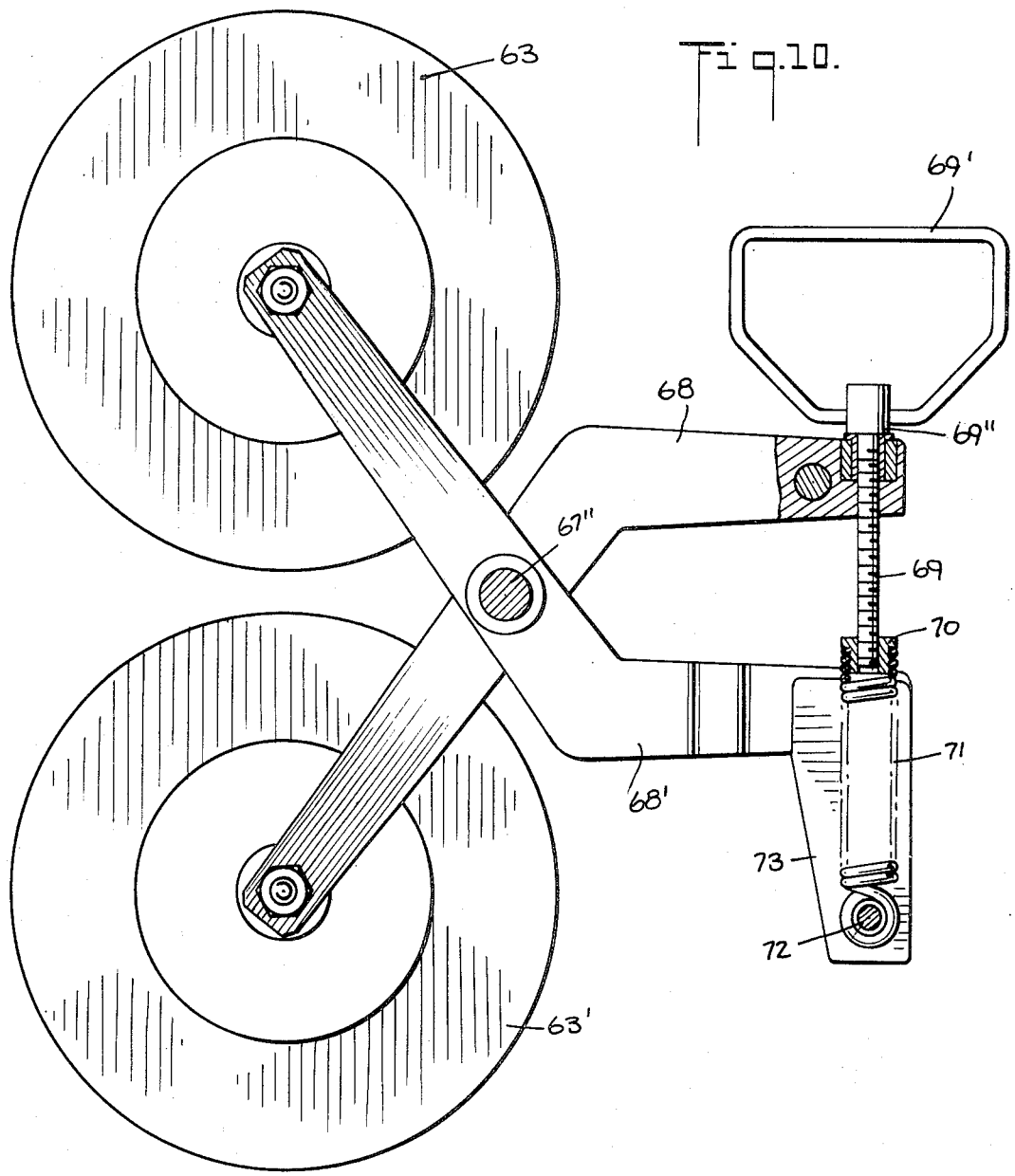

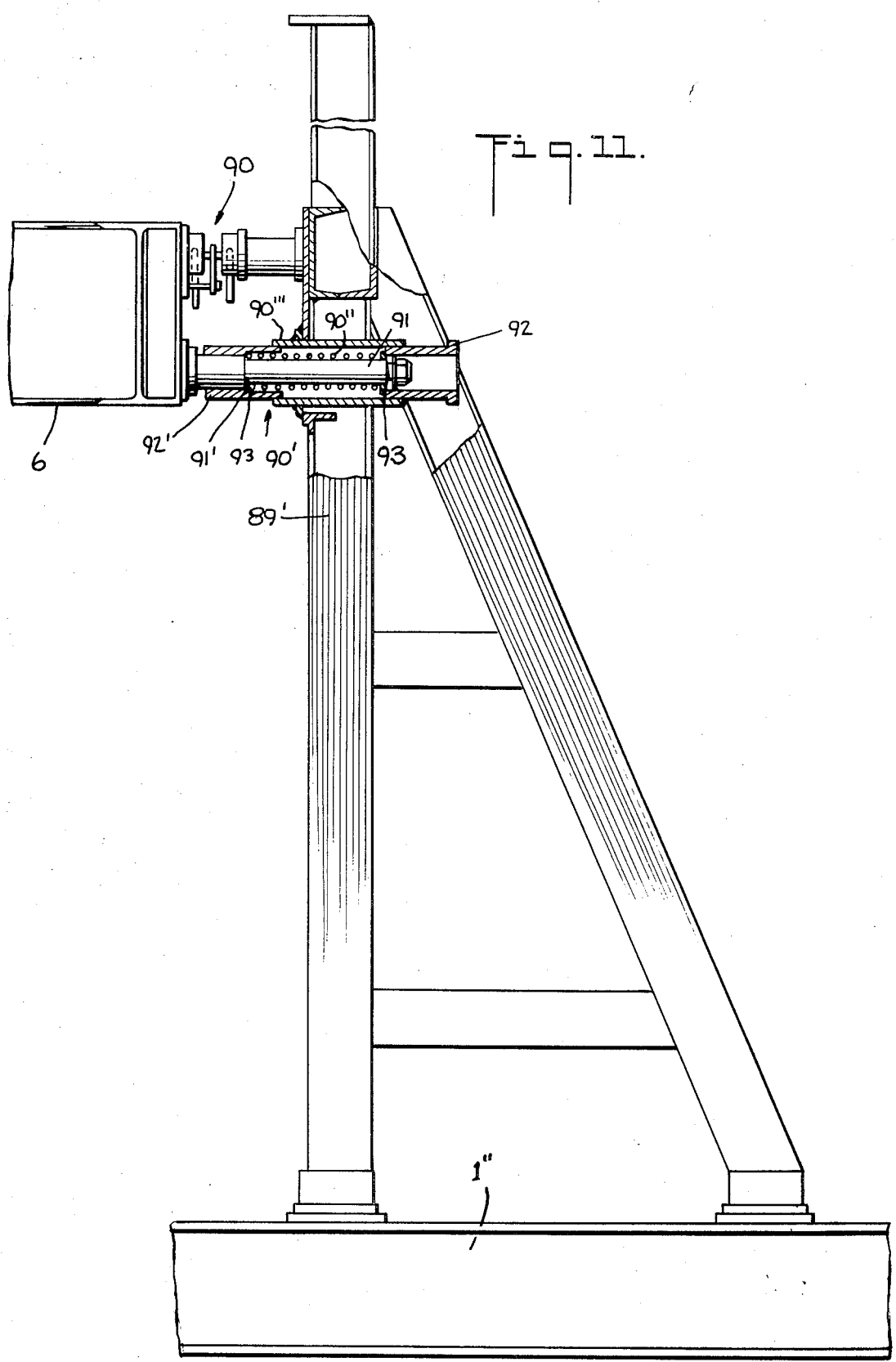

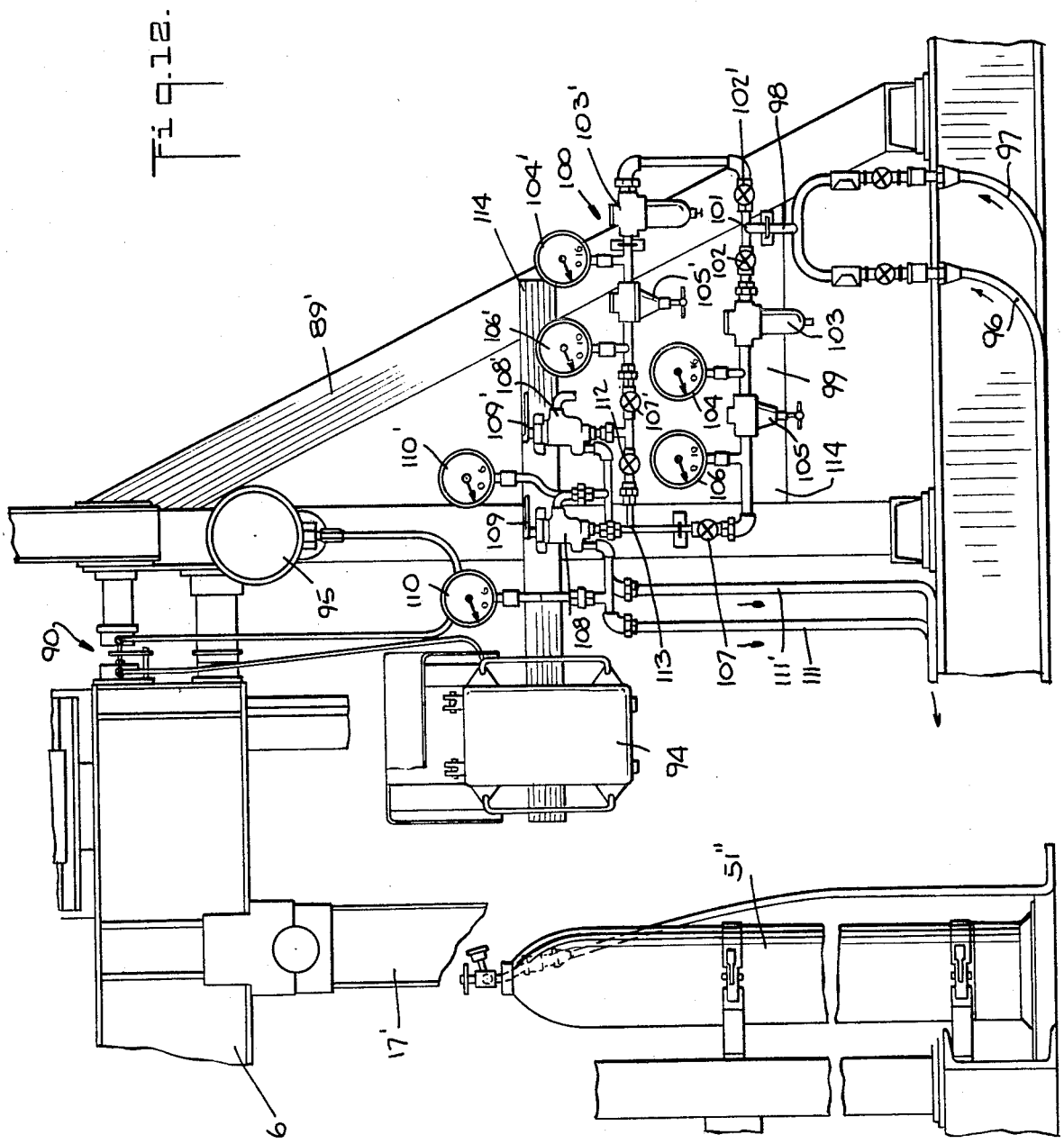

EQUIPMENT FOR LAYING OR RECOVERING SUBMARINE CABLES

The present invention relates to equipment for laying or recovering submarine cables.

Submarine cables to be laid from or recovered on a watercraft usually are gathered in coils thereon, such as on a drum or spool, from or to which they are fed. Such cables normally have a central conductor or conductors surrounded by insulation which in turn is covered by a sheath of various types. During the laying or gathering of the cable, care must be taken to avoid deforming the insulation so as to avoid damage to the electrical characteristics of the cable.

In one known type of equipment for laying or recovering such cables, the cable is wound on a winch driven, take-up drum, and as it is wound thereon, it is moved in a direction axially of the drum by blades pressing against the sheath thereof to form a tight-wound helical coil. Such blades can exert sufficient pressure on the sheath, and hence, on the insulation, to damage the latter.

The object of the present invention is to provide equipment for laying or recovering submarine cables without applying pressure to the cable which will damage it.

The equipment for laying or recovering submarine cables of the present invention is used on a watercraft which carries a coil of the cable, and a frame and a base which extends in the direction in which the cable is being laid, said equipment comprising a first driving pulley, a second driving pulley and a pulley for guiding the cable into the water, said three pulleys being placed in a line on the base, in the order named, from the cable coil towards the point where the cable goes into the water, said cable extending from the coil thereof to the second driving pulley around which it is wrapped in an arc of less than 360°, then to the first driving pulley around which it is wrapped in a further arc of less than 360° and lastly resting on the pulley for guiding the cable into the water, each of the said driving pulleys being equipped with a motor and a brake and the plane of one pulley being inclined with respect to the plane of the other in order to avoid interference in the run of the cable.

In addition, the present invention includes, for the above-mentioned equipment for laying or recovering submarine cables, a pressure system suitable for pushing the cable into the races of the driving pulleys, said pressure system being formed by pneumatic wheels, the plane of which is parallel to the associated driving pulley.

The objects and advantages of the invention will be better understood from the following detailed description of the presently preferred embodiment thereof, which description should be considered in conjunction with the accompanying drawings in which:

FIG. 6 is an end view, partly in cross-section, of an oscillating upright or stand forming part of the equipment;

FIG. 7 is a side elevation view of an emergency brake for a control group forming part of the equipment;

FIG. 8 is a schematic, perspective diagram of the water-cooling plant for the service brakes forming part of the equipment;

FIG. 9 is a schematic diagram of the hydraulic system for the hydraulic motors forming part of the equipment;

FIG. 10 is a side elevation view of a pair of pressure wheels forming part of the equipment;

FIG. 11 is a side elevation view, partly in cross-section, of the pressure cell portion of the equipment; and FIG. 12 is a side elevation view of the controls for the pneumatic plant for service braking.

Figure 1:
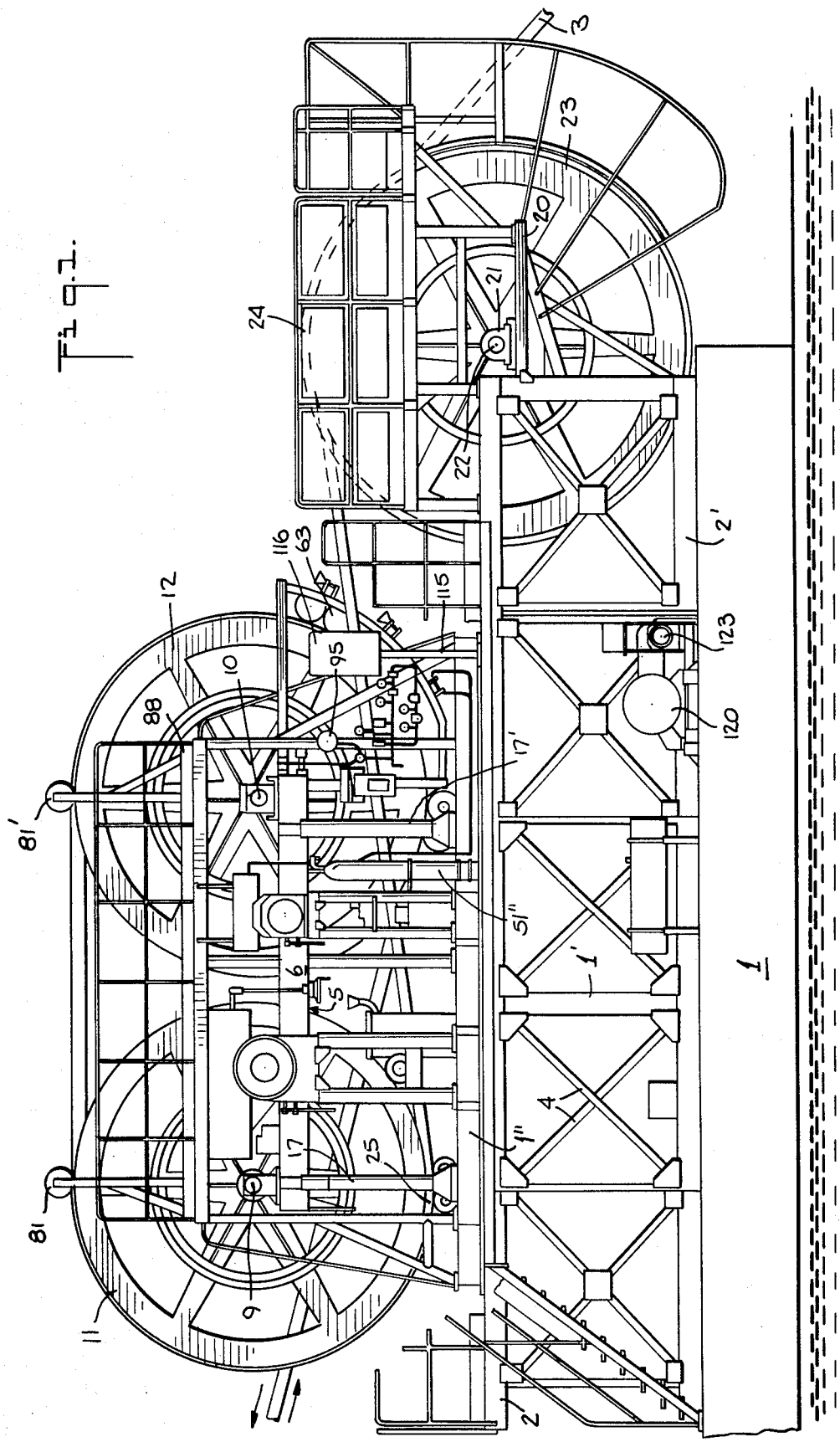
FIG. 1 is a side elevation view of the equipment mounted on a water borne ship.

With reference to FIG. 1, the equipment for laying or recovering submarine cables is shown mounted on a watercraft 1 which carries a cable coil (not illustrated in the figures) and a base 1' extending in the direction in which the cable 3 is being laid.

The base 1' is formed by a reticulated structure having crossed rods 4, the ends of which are welded to an upper beam 2 and a lower beam 2'. On the base 1', a supporting structure in the form of a frame 5 comprises two side members 6 and 6' (FIGS. 4 and 5) extending in the direction of the length of the base and having an I-shaped section. The members 6 and 6' are parallel to one another and have a length which enables them to carry the stands 7 and 7' and 8 and 8' (FIGS. 3, 4, and 5) supporting two shafts 9' and 10' with axes 9 and 10, said shafts 9' and 10' being connected to and carrying two pulleys 11 and 12 which are the first and second driving pulleys respectively.

The outer lower flanges of each side member 6 and 6' are interrupted in proximity to and at the same distance from each end (FIGS. 1 and 2) to enable the welding to the side members 6 and 6' (FIGS. 2, 4 and 5) of supports 13—13' and 13''—13''' with circular through-holes having axes 14—14' which pass under the side members 6 and 6'. Two further pairs of supports 15—15' and 15''—15''' (FIGS. 2, 4 and 5) are affixed to the base frame 1'' with the same spacing as the axes 14 and 14' of the supports 13—13''', such supports 15—15''' having circular through-holes with axes 16 and 16'.

Two uprights 17—17' (FIGS. 1, 2, 4, 5 and 6) each have a circular through-hole at each end with axes which coincide with the axes of the holes in the supports 13, 13', 15 and 15'. The two uprights 17 and 17' have dimensions which enable them to be held, both at the top and at the bottom, between each pair of side member supports 13—13''' and 15—15''' and above the base frame 1''.

The diameter of the two holes in each upright 17 and 17' is larger than that of the supports outside it since they receive bushings or roller bearings at each end, e.g., 17'' and 17''' (FIG. 6). A pin 18 passes through the circular holes (FIG. 6) in the upper pair of supports 13 and 13' and through the bearings 17''' and the hole in the upper end of the upright 17. A second pin 19 passes through the circular holes in the lower pair of supports 15 and 15' and the bearings 17" and the hole in the lower end of the upright 17. Similarly two pins, upper and lower respectively, pass through the upper and lower holes drilled in the second upright 17'.

The supporting structure 5 (FIGS. 1 and 2) thus takes on the form of an articulated parallelogram, with arms formed by the uprights 17 and 17' and with pivotal connections with the supports fixed to the base frame 1" and the frame 5, the connections comprising the pins 18, 19, etc. The frame 5 can, therefore, oscillate fore and aft of the base frame 1", and pressure exerted on the supporting structure in the direction of the ship's length causes the upper side members 6 and 6' to move slightly in the direction of the pressure. The apparatus for limiting the range of oscillations will be described in detail hereinafter.

At one end of the base 1' a structure 20 (FIG. 1) is welded, and above the latter a stand 21 supports a shaft 22 of a pulley 23 called the cable guiding pulley. The guiding pulley 23 has its highest point 24 at a higher level than the lowest point 25 of the first driving pulley 11. Pulleys 11 and 12 are not in parallel planes, pulley 12 having axis 10 (FIGS. 3 and 5) inclined in respect of the horizontal plane of the base frame 1".

Figure 4:
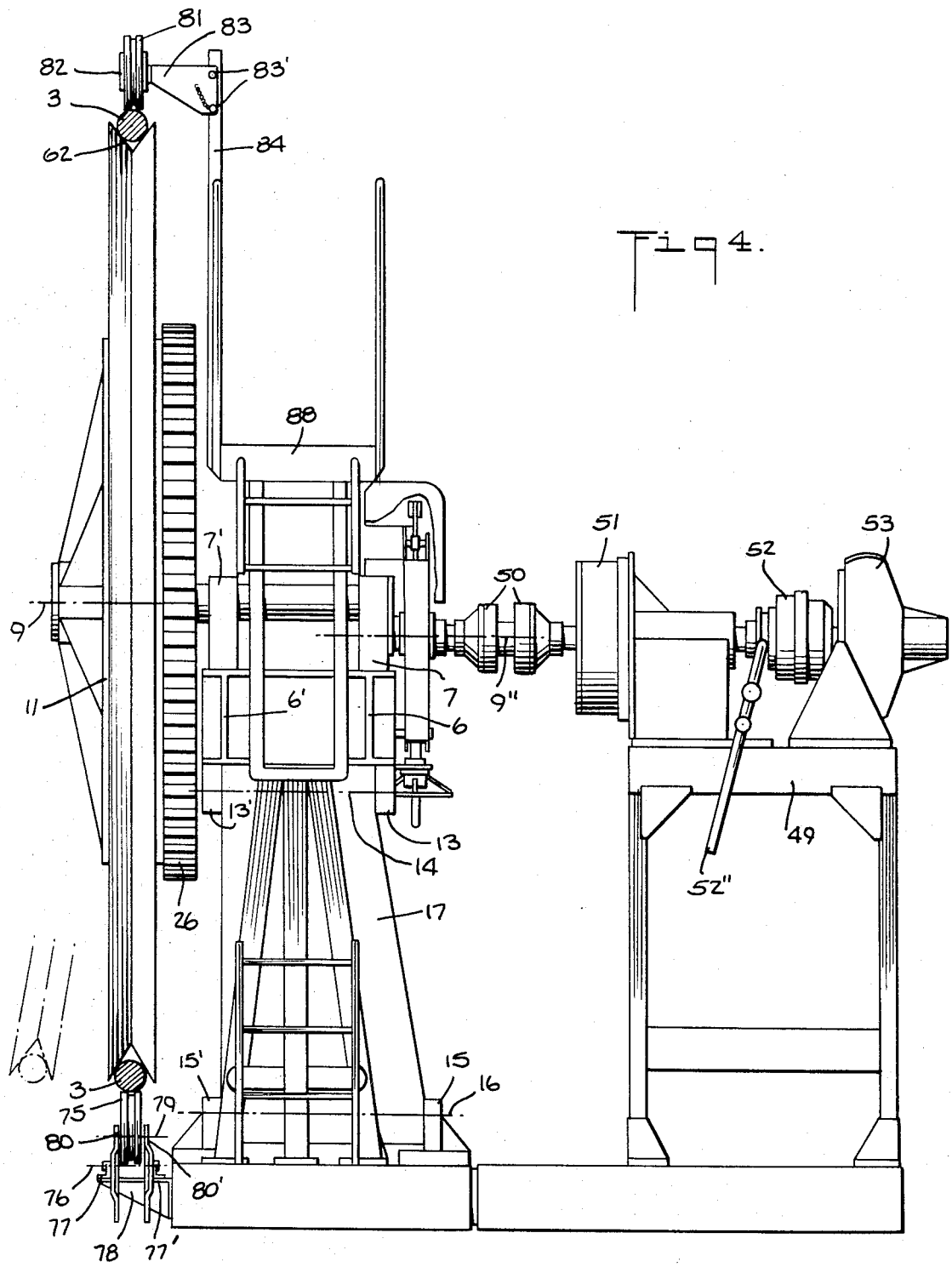
FIG. 4 is an end elevation view of the equipment shown in FIG. 3.
Figure 5:
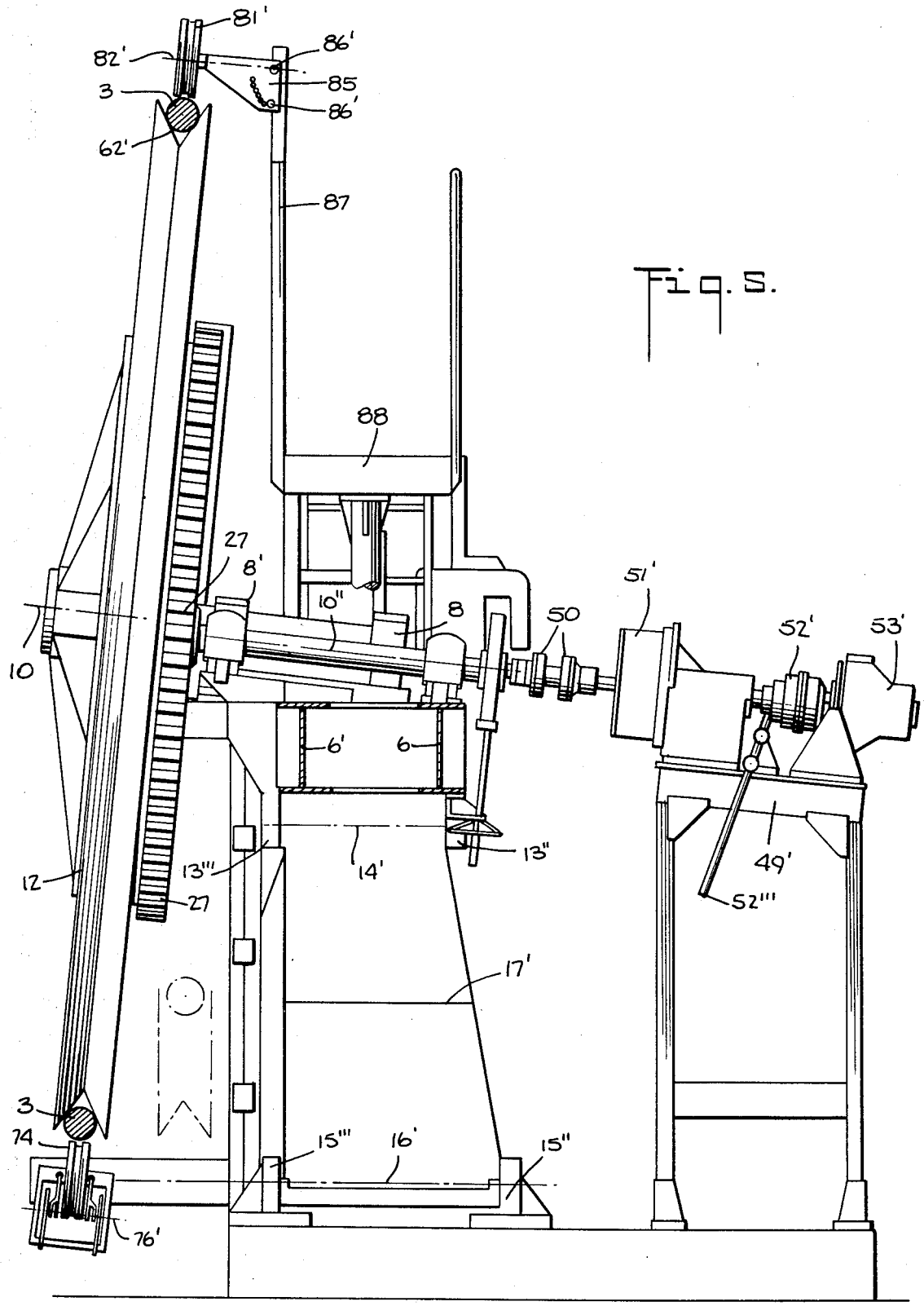
FIG. 5 is a sectional view of the equipment taken along the line 5—5 shown in FIG. 3.

The driving pulleys 11 and 12 are driven by a system of gears formed by gear wheels which are inter-meshed (FIGS. 4 and 5). The gear wheel 26 can be seen in FIG. 4 and is co-axial with axis 9. The gear 26 is driven by a gear which is not visible in the figure but which is co-axial with the axis 9" and driven by the motor 53. Similar gears 27 and 27', having axes 10 and 10" respectively, are shown in FIG. 5, and the gear 27 is driven by the motor 53'.

The gears 26, 27 and 27' are covered by two housings 28—28' (FIGS. 2 and 3) secured to the oscillating frame 5.

Two emergency brake pulleys 31 and 32 are mounted on extensions of the shafts having the axes 9" and 10". Both emergency brakes are similarly constructed and the braking apparatus for the pulley 31 is shown in FIG. 7. As shown in FIG. 7, shoes 33 and 34 which are engageable with the periphery of the pulley 31 rotate around the axes of pins 35 and 36 which are attached to the side member 6 by means of nuts (not shown). The shoe 33 has a hinge 37 which connects the former to a rod 38, the length of which can be adjusted, linked to a lever 39 by means of a pin 40. The other shoe 34 at the other end has a pin 41 which connects it to the lever 39. The latter is linked to a rod 43 by a pin 42, and the rod 43 is threaded at the opposite end.

A handwheel 44 resting against the lower flange of said member 6 is secured to a fully threaded collar 45, and when it is moved, it causes the emergency brake to be operated by means of an upward or downward movement of the rod 43. Thus, rotation of the handwheel 44 in one direction causes the rod 43 to be pushed upwards, and the lever 39 via the pin 40 will force the adjustable rod 38 to move the shoe 33 away from the brake pulley 31. Simultaneously, the lever 39 will move the pin 41 away from its original position, and therefore, the shoe 34 will also be moved away from the brake pulley 31. Similarly, rotation of the handwheel 44 in the opposite direction will move the shoes 33 and 34 toward the pulley 31. Braking surfaces 46 and 47 determine the braking action on the pulley surface and are connected to the shoes 33 and 34 with pins 48 and 48'.

The two motor units for the driving pulleys 11 and 12 are placed co-axially with respect to the brake pulleys 31 and 32. The two motors units are placed on two structures 49 and 49' which rest on the base frame 1" (FIGS. 3, 4 and 5), and are arranged at right angles to the oscillating supporting frame 5. The emergency brake pulleys 31 and 32 and the drive gears for the gears 26 and 27 are coupled to the motor units by means of two universal joints 50 and 50' which allow the supporting frame 5 to oscillate slightly in a transversel direction with respect to the supporting structures of the motor units.

Figure 3:
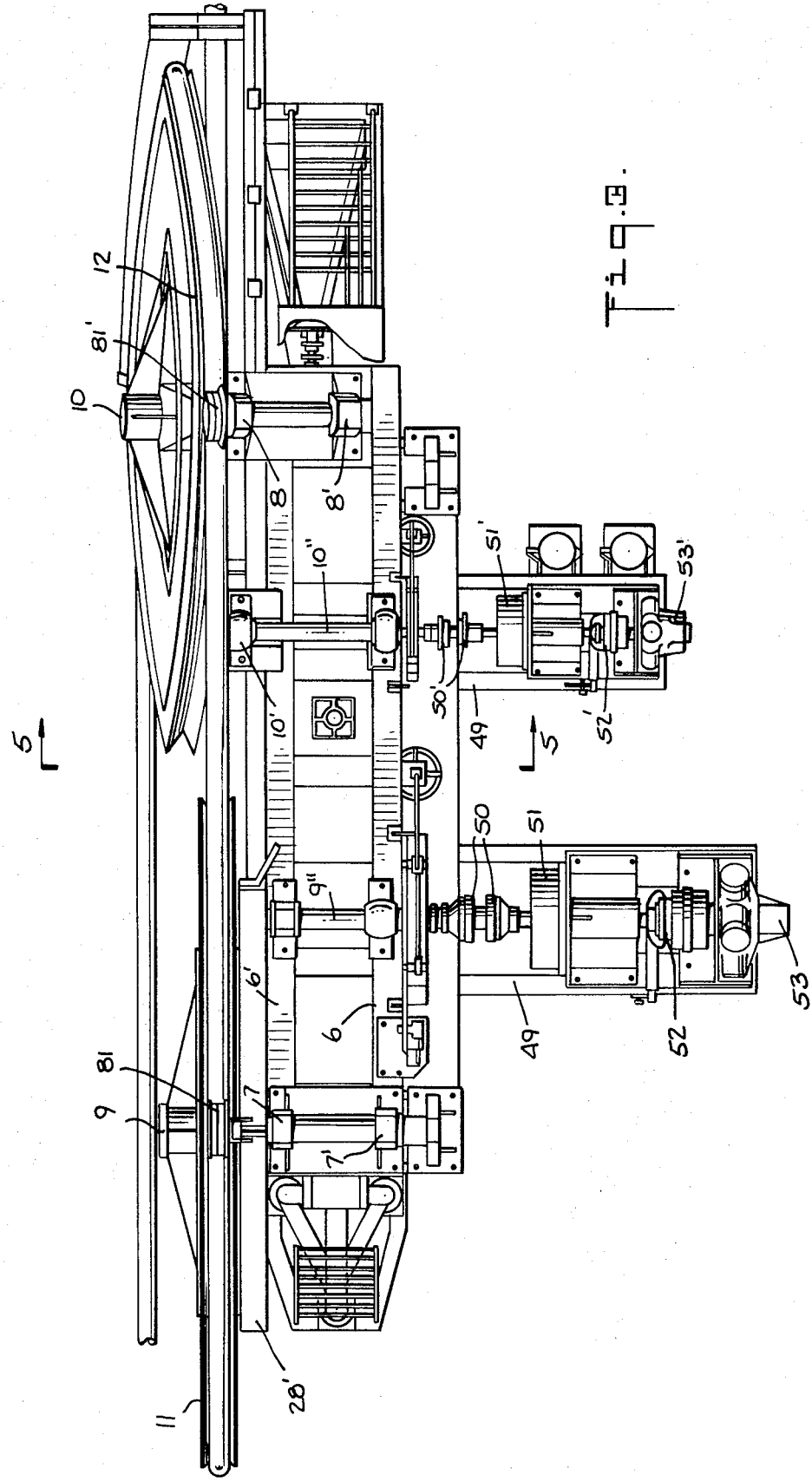
FIG. 3 is a plan view of the embodiment in FIG. 1 with the guiding pulley omitted.

Each motor unit comprises a compressed air brake 51 and 51', a dog clutch 52 and 52' and a hydraulic motor 53 and 53' (FIGS. 3, 4 and 5). The hydraulic motors 53 and 53' can be connected or disconnected by moving the lever 52" or 52"' (FIGS. 4 and 5) which activates the respective dog clutch 52 or 52'. The air under pressure for the brakes 51 and 51' is supplied from cylinders 51" (FIGS. 1 and 12). Brakes 51 and 51' are cooled with fresh water in forced circulation as described hereinafter and shown in FIG. 8.

Referring to FIG. 8, the fresh water, driven by a pump (not shown in the figures), will enter piping 56' and will then pass into a heat exchanger 56, travel along this and move out through pipe 56" towards the drums of the two brakes. The water, after having absorbed the heat developed during braking, reaches, by means of pipes 57 and 57', a tank 58 and subsequently returns to the pump via pipe 59. A second pump (not shown in the figures) sends sea or other water into the heat exchanger 56 through an entry pipe 60 and after having cooled the fresh water in the exchanger 56 is discharged by means of pipe 61.

The two hydraulic motors 53 and 53' cause movement of the cable 3, and the two motors 53 and 53' are supplied by a hydraulic system shown in FIG. 9.

Two pumps 53" and 53"', one per motor respectively, are driven by means of a belt drive 53"" and a marine diesel engine 120. One of the pumps 53"" is of the variable capacity type, and the other 53" has a fixed capacity and is connected to a relief valve 55. When the cable laying or recovering speed has to be regulated, the variable capacity type pump 53"" is used. The fixed capacity pump 53" adapts itself to the new running conditions by discharging the excess fluid through the relief valve. Both motors 53 and 53' could be fed with two variable capacity type pumps, but in this event, any change in the cable laying or recovering speed would call for a double adjustment of the capacity of the two pumps.

The fluid for the two motors comes from a tank 122 and is conveyed to the pumps 53" and 53"' through stop valves 122" and 122"' and the flexible pipes 122A and 122B. From the pipe 122A, the fluid flows through a stationary pipe to the fixed capacity pump 53", and from the pipe 122B the fluid flows through another stationary pipe and a filter 122C to the variable capacity pump 53"'.

At the outlet of pump 53", pipe 55", with an intermediate flexible pipe 55', leads to a distributor 53A, the function of which is to regulate the input and output direction of the fluid for the hydraulic motor 53'.

Pipe 54 with intermediate flexible pipe 54' and filter 54" forms the fluid's return route to the tank 122.

A relief valve 55 forces the excess fluid into the tank 122 through piping 55A and a maximum pressure valve 55A'. The same piping 55A carries the fluid to a control gauge 122H which indicates the extent of pressure of the fluid coming from the pump 53". Immediately following the flexible pipe 55', and before the distributor 53A, is a pipe 53E which leads to a gauge 53C inserted in a control panel 116 (FIG. 1).

At the outlet of the pump 53''', a pipe 55'''' and a flexible pipe 55''' lead to a distributor 53B which regulates the input and output direction of the fluid for the hydraulic motor 53. The pipe 54, with an intermediate flexible pipe 54', and a filter 54", forms the fluid's return route to the tank 122. Piping 55B, at the outlet of the pump 53''', carries the fluid to a gauge 122E for pressure measurement and links up with a maximum pressure valve 55B'. Immediately following the flexible pipe 55''', and before the distributor 53B, is an offtake with piping 53F for a gauge 53G inserted in the control panel 116 (FIG. 1).

The two distributors 53A and 53B are used to cause the hydraulic motors 53 and 53' to rotate in one direction or the other. The marine diesel engine 120 completes the driving unit and constitutes the main motor.

The engine 120 is supplied with diesel oil, and in addition to driving the pumps for the hydraulic motors, it drives the water pumps for cooling the air brakes. The power unit is completely self-contained, and there are no electric machines.

As is apparent, the two hydraulic motors 53 and 53' cause movement of the cable 3 which unwinds from a takeup drum (not shown) and subsequently winds (FIG. 1), in order, onto the second driving pulley 12 in an arc of less than 360°, then, on exiting from the latter, winds onto the first driving pulley 11, thence passing on exiting in the direction of the guiding pulley 24 and, finally, into the sea.

The cable 3 is inserted into races 62—62' of the driving pulleys 11 and 12, these races being V-shaped (FIGS. 4 and 5) and being covered with material having a high coefficient of friction, such as rubber.

To prevent the cable from slipping, a system of pressure wheels is employed. On the second driving pulley 12 (FIGS. 1 and 2) a system of small diameter wheel 63 with rubber tires, which will hereinafter be called pressure wheels, is arranged, and such wheels are joined in pairs along supporting arches 64 which form an integral part of oscillating frame 5, being supported therefrom by means of beams 65—66. In the region of each pair of pressure wheels, on the lateral surfaces of said arches 64, there are two holes 67 and 67' (FIG. 2), one below the other and radially aligned with respect to the center of the pulley 12. Such holes 67 and 67' are designed to take pins 67" (FIG. 10), and are arranged in two arcs of different radius, one of which contains all the holes 67 and the other of which contains all the holes 67'.

Each pin 67" (FIG. 10) is the center of rotation for two arms 68—68' crossed like scissor blades. At one end of each arm, a pressure wheel 63 is rotatably mounted and the distance between the remaining two ends of the arms is predetermined. A screw 69 (FIGS. 2 and 10), complete with a handwheel 69' for tightening, is housed so as to have a head 69" (FIGS. 10) resting against the upper arm 68, and a threaded bushing 70 is threaded on its lower end. The outside of the bushing 70 is grooved to take the turns of a spring 71, the other end of which is connected to a point 72 on a stretching plate 73 which forms an integral part of the lower arm 68'.

When a pressure wheel 63 moves, for example, the one having its center of rotation at the highest level with respect to the other wheel in the same pair, a corresponding rotation of arm 68' around the pin 67" situated on the metal support 64 occurs. The other end of the same arm 68' will thus be moved away from its position of balance tending to stretch the spring 71 which will counteract this movement.

By turning the handwheel 69' on the upper part of the screw 69, the spring 71 can be adjusted, thus changing the relative position of the two pressure wheels 63 and 63' for the purpose of varying the pressure on the cable 3 or to permit the passage of a cable with a different diameter.

The two holes 67 and 67', radially aligned with the center of the second driving pulley 12, permit the whole system of pressure wheel 63 to be adjusted toward or away from the pulley 12 so as to allow additional adjustment of the wheel pressure on the cable or, as previously described, the passage of a cable with a larger diameter.

The cable 3 is also pressed against the race of the two driving pulleys 11 and 12 (FIG. 2) at the lowest point thereof by two pairs of wheels 74 and 74' and 75 and 75' (FIGS. 2, 4 and 5) with rubber tires. The two pairs of wheels are supported by arms which oscillate round axes 76 and 76' (FIGS. 4 and 5). The pair of wheels 75 and 75', only wheel 75 being visible in FIG. 4, has a support axis 76 extending between L-shaped plates 77 and 77' welded to a bracket 78 which in turn is connected to the base frame 1" by bolts (not shown). The wheel 75 is free to rotate around its axis 79 and is supported by the arms 80—80'. The surface of the wheel tire rests on the cable 3 which is inserted in the V-shaped race of the pulley 11.

The pair of wheels 74—74', only wheel 74 being visible in FIG. 5, has the same connection as that described for the pair of wheels 75—75'.

Two wheels 81 and 81' with tires (FIGS. 1, 2, 3, 4 and 5) are placed under pressure, one above each of the two driving pulleys 11 and 12, and serve to prevent the cable 3 from slipping out of the races. The wheel 81 (FIG. 4) has a rotating shaft with an axis 82, and the shaft is carried by a support 83 connected with two pins 83' to an upright 84 which is linked to a structure which will be described hereinafter. Similarly, the wheel 81' (FIG. 5) has a rotating shaft with an axis 82', and the shaft is carried by a support 85 connected with two pins 86' to an upright 87 which is linked to the same supporting structure as the upright 84. The upper part of the upright 87 slopes slightly to enable the supporting plate 85 to tilt the wheel 81' so that the latter is in the same plane as the second driving pulley 12. The two uprights 84 and 87 rest on a structure 88 (FIGS. 1, 2, 4 and 5) which acts as a service gangway for the high part of the machine.

Figure 2:
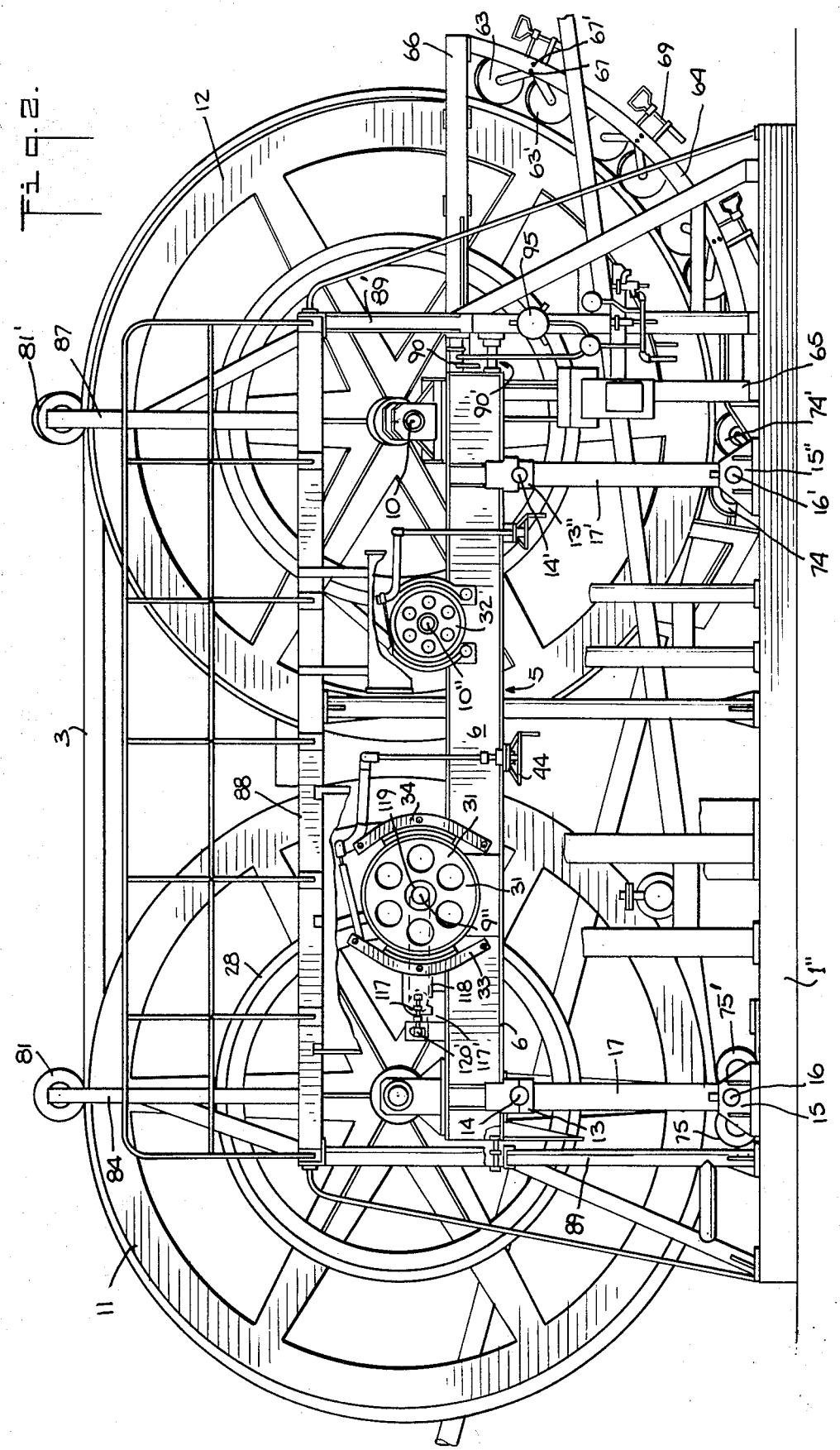
FIG. 2 is an enlarged side elevation view of the equipment corresponding to FIG. 1 but with the base and motor groups omitted.

Reference will now be made to the form of the structure used to hold the oscillating frame 5. As already mentioned, there is provision for limiting the range of the oscillations, and this system comprises an arrester frame 89' for limiting movement in one direction and a frame 89 for limiting movement in the opposite direction (FIGS. 2 and 11).

Between the frame 89' and the upper cross members of the frame 5 (FIG. 11), pressure cells 90 of an hydraulic dynamometer (which can also be electric) and compensating system 90', in the main composed of a spring 90" are mounted. The compensating system comprises a hollow cylindrical shell 90"' having its axis parallel to the plane of the base frame 1". The spring 90" is wound around a solid cylinder 91 which also is parallel to the base frame 1" and is fixed to the oscillating frame 5. Two externally threaded couplings 92 and 92' are screwed into the ends of the hollow shell 90"', pre-compressing the spring 90", the end turns of which press against the couplings through washers 93 and 93'. The solid cylinder 91 has a reduced section 91' formed to engage part of the surface of the washer 93'. Each time that the oscillating frame 5 moves, the solid cylinder 91 compresses the spring 90" through the washer 93' or the washer 93 depending on the direction of the movement.

The whole unit, comprising the upper side members, uprights, base frame, arrester frames, dynamometer cells and compensating spring, forms a dynamometer incorporated in the machine. In prior machines, the dynamometer is separate, and in this case it has been incorporated in the machine in order to reduce in a marked way the overall dimensions of the equipment.

The dynamometer functions in the following way. The upper side members 6 and 6' can oscillate longitudinally since they are fitted with pivotal connections on the two vertical uprights 17 and 17'. The oscillations are, however, kept with extremely low limits, of the order of a millimeter, whereas the length of the uprights 17 and 17' is of the order of a meter. With such kinematic motion, any given point of the side member 6 and 6' makes an arc of a circle which is restricted to such an extent that it can be considered as a straight line parallel to the base 1'. The dynamometer cells are situated with their axes parallel to the base 1', and, therefore, parallel to the direction in which the side member oscillates, which means that they are in condition to function properly.

When the base of the machine is horizontal, the uprights 17 and 17', at whatever end of the very limited chord they happen to be, are nearly vertical. A very small component of the weight of the above-mentioned suspended masses is released against the arrester frames 89 and 89', the component being small enough to fall within the dynamometer's field of error and not even be registered. Under these conditions, if a tractive force produced by the machine is exerted on the length of cable emerging from the machine and passing via the guiding pulley 23 into the sea, the side member is pulled towards the guiding pulley 23 and the dynamometer cells only register such force in addition to restricting the side member's movement.

The pressure cells 90, being two in number and being situated one behind the other, both sense the force which passes through them from the side members 6 and 6' to the arrester frame 89'. One cells transmits the pressure information to a dial-type dynamometer 94, and the other to a recording dynamometer 95 (FIG. 12).

It is to be noted at this point that the range of the oscillations is limited to the distance that has to be travelled by the mobile ends of both cells. In order to compensate for the forces from zero to the bottom of the scale, a screw (not shown) placed on the frame 89' is adjustable so that at a zero value there is no other distance free for the side members to travel, i.e., the clearance between the frame and the cells is nil, thus precluding unnecessary movements and related forces of inertia.

Since the machine must be assembled on a watercraft, the longitudinal oscillations of the latter induce forces of inertia in the suspended masses of the machine as well. The frequency of oscillations deriving from the wave motion is not, however, such as to produce forces of inertia which can be registered by the dynamometers (when, of course, the sea condition permits the work for which the machine has to be used) as long as the travel of the side members and related masses is reduced to the extent required for the cell's operation.

The same concept applies to sudden changes of tension on the cable, in which case, the restricted travel serves to prevent the suspended masses from being subjected to accelerations of a degree that would disturb the measurements.

Since it is unlikely that a watercraft, even in conditions of absolute calm, maintains a position where the machine's base is always horizontal, the dynamometric unit also incorporates the compensating system previously described in the construction details.

The compensating system works in the following way. If the base is sloping towards the guiding pulley, the longitudinal component of the weight of the side members and relevant connected masses is released onto the pressure cells 90, which, if compensation did not take place, would register this component as applied force to the cable 3. In order to balance this component, the spring 90" is loaded as described, thus releasing the cells, until the instrument readings are brought to zero. The spring has a flexibility which prevents the load changes caused by the travel of the frame 5 from being registered.

Assuming that the base is sloping in the opposite direction (in the direction to release the cells) the compensating spring 90" is operated in a reverse manner until the instruments are on the point of registering an excess compensation by the spring. In this way, a situation is achieved whereby the instruments register the tension on the cable starting from zero and not from the point when the tension equals the above-mentioned component, which in this case works in the opposite direction to that of the cells' operation.

As already mentioned, the dial-type dynamometer 94 and the recording dynamometer 95 (FIG. 12) enable the movements of the oscillating structure to be followed. Alongside the instruments already described, the compressed air instrumentation is to be found. Two flexible pipes 96 and 97 convey compressed air, coming from two cylinders 51", to a single pipe 98 which in turn branches into two separate pipelines through which the air travels one in a clockwise direction 99 and the other in the counter-clockwise direction 100.

In order to effect perfect visual checking of the braking operations, instruments are required which are always efficient and for this reason as well, provision is made for feeding the two brakes from separate pipelines, each supplied with measuring instruments, or alternatively from a single pipeline. This provision also makes possible maintenance and repair operations on one system while the other is in use.

The clockwise route of the air starting from a T-union 101, is from a valve 102, to a filter 103, a manometer 104, a pressure regulator 105, a second manometer 106 and to a valve 107. The counter-clockwise route comprises a valve 102', a filter 103', a manometer 104', a pressure regulator 105', a second manometer 106' and a valve 107'.

The valve 112 joins together or separates the above two routes. When the valve 112 is closed, the air in the pipeline circulating in a clockwise direction passes into a pressure regulator 108 equipped with a control lever 109, and subsequently, with pressure measured by a manometer 110, goes to the first brake via a pipe 111.

Similarly, the air flowing in the other pipeline in a counter-clockwise direction passes into a pressure regulator 108' equipped with a control lever 109', and subsequently, with pressure measured by a manometer 110', goes to the second brake via a pipe 111'.

If it is necessary to replace a manometer, for example, manometer 106, it will be sufficient to close the valves 102 and 107 and leave the others open, including the valve 112. In this way, the air along the counter-clockwise route and through the pipes 111 and 111', will reach both brakes.

The elements constituting the air circuit are mounted on beams 114 and 114' and the fixed frame 89'.

On a support 115 (FIG. 1) resting on the plane of the base frame at approximately the same height as the other instruments, is a control panel 116. This panel (the front of which is not visible in the drawing) has a speed gauge. The speed gauge is connected to a speedometer dynamo 117 (FIG. 2), and will give a reading which is proportional to the rim speed of pulley 119 having regard to the fact that the pulley 119 is connected to the dynamo by means of belts 118. The dynamo rests with a framework 117' above the upper flange of side member 6. The pulley 119, on its part, is driven at a speed proportional to the speed of the first driving pulley 11, the ratio of the speeds being that of the relevant gears. In addition a footage indicator 120' is connected to the dynamo's shaft to show the length of cable laid or lifted.

In operation, the operator stands adjacent the gauges 95, etc., and the control panel 116 (FIG. 1) where he is able to observe the various instruments including those showing cable speed (speed gauge) braking pressure (manometers 110 and 110') ad cable tension (dynamometers 94 and 95).

During the laying of a cable, it is drawn from the storage drum and threaded around the pulleys 11, 12 and 23 as described and between the pulleys 11 and 12 and the pressure wheels 63, 63', 74, 74', 75, 75', 81 and 81'. As the cable 3 is fed into the water from the pulley 23, its weight moves the frame 5 in the direction of laying, and the operator controls the tension thereon and the movement thereof by regulating the air brakes 51 and 51' by means of the levers 109 and 109' of the regulators 108 and 108'.

When it is desired to recover a cable, it is similarly threaded on the pulleys and to the storage drum which is controlled to gather the cable as it is fed from the pulley 11. The hydraulic motors 53 and 53' are activated by activating the pumps 53'' and 53''', the variable capacity pump 53'''' which controls the first driving pulley 11 being controllable, and hence, controlling the speed of the motor 53, by a control lever on the panel 116. The other pump 53'' has an overflow connection which returns the excess fluid to the tank 120. The speed of movement of the cable 3 will be indicated by the speed gauge driven by the dynamo 117 connected to the pulley 11 and the cable tension will be indicated by the dynamometers 94 and 95. The cable is pulled mainly by the pulleys 11 and 12 and the take-up drum for the cable merely maintains the tension on the cable required to permit the pulleys 11 and 12 to pull the cable.

The engine 120 (FIG. 1) is housed immediately on top of the watercraft 1 and in a forward position with respect to the base 1'. By belt transmission, movement is transmitted to the pumps with axes 123 which feed the hydraulic motors 53 and 53'.

It will be apparent to those skilled in the art from the foregoing description of the preferred embodiment of the invention that during the process of laying or recovering a cable, the cable is not subjected to forces which will damage it. Even though the cable is wound on a drum or spool, the tension thereon at the drum or spool is much less than is the case when the cable is merely passed over guiding pulleys and the movement of the cable is due only to the rotation of the drum, and therefore, the force required to be applied to the cable by the turn distributing device, e.g., the aforementioned blades, is much less.

The preferred embodiment and the alternatives described merely illustrate the principles of the invention, and it will be apparent to those skilled in the art that various modifications may be made in the construction and operation of the apparatus disclosed without departing from such principles.

We claim:

1. Apparatus for feeding a submarine cable to and from a storage device respectively from and to the water comprising a guide means spaced from said storage device in the direction of laying of the cable for guiding said cable into the water, first and second rotatably mounted drive pulleys intermediate said storage device and said guide means and having cable receiving peripheral races, said pulleys being mounted in spaced relation in said direction with said first pulley nearer said storage device than said second pulley and with the planes of rotation of both said pulleys extending substantially parallel to said direction but with one said plane at an angle to the other whereby said cable may pass without interference from said storage device to one portion of said second pulley and part way therearound, then to one portion of said first pulley and part way therearound and then to said guide means, motor means for driving said pulleys connected thereto and braking means for braking said pulleys connected thereto.

2. Apparatus as set forth in claim 1, wherein said motor means comprises a pair of hydraulic motors, one connected to drive one of said pulleys and the other connected to drive the other of said pulleys.

3. Apparatus as set forth in claim 2, further comprising a hydraulic fluid system including a pair of fluid pumps, one connected to drive one of said motors and the other connected to drive the other of said motors, and at least one of said pumps being a variable capacity pump.

4. Apparatus as set forth in claim 3, wherein both of said pumps are variable capacity pumps.

5. Apparatus as set forth in claim 3, wherein one of said pumps is a fixed capacity pump and further comprising a relief valve connected in the fluid system thereof.

6. Apparatus as set forth in claim 3, wherein said system comprises a diesel engine connected to said pumps for driving the latter.

7. Apparatus as set forth in claim 2, wherein said motors are connected to said pulleys through a dog clutch.

8. Apparatus as set forth in claim 1, wherein said braking means comprises a pair of air actuated brakes, one connected to brake one of said pulleys and the other connected to brake the other of said pulleys.

9. Apparatus as set forth in claim 8, further comprising means for water cooling said brakes.

10. Apparatus as set forth in claim 9, wherein said water cooling means includes a heat exchanger, means for circulating fresh water through said brakes and one portion of said heat exchanger, and means for circulating sea water through another portion of said heat exchanger.

11. Apparatus as set forth in claim 1, wherein said pulleys are mounted on a frame mounted for reciprocal movement to a predetermined extent in said direction.

12. Apparatus as set forth in claim 11, wherein said frame is mounted on a base by a pair of uprights spaced in said direction and extending from said base to said frame, said uprights each having a pivotal connection at opposite ends with said base and said frame with substantially parallel pivot axes extending transversely to said direction.

13. Apparatus as set forth in claim 11, wherein said motor means is mounted on a fixed supporting structure and comprises a pair of motors having rotatable shafts, said motors being mounted wit the axes of said shafts extending at right angles to said direction, and said motor means is connected to said pulleys by universal coupling means extending between said shafts and said pulleys.

14. Apparatus as set forth in claim 11, further comprising means for limiting said movement of said frame comprising a stationary frame adjacent and connected to said first-mentioned frame.

15. Apparatus as set forth in claim 14, further comprising pressure sensitive cells connected between said stationary frame and said first-mentioned frame and responsive to movement of the latter.

16. Apparatus as set forth in claim 15, further comprising indicating means connected to said cells for indicating the movement of said first-mentioned frame.

17. Apparatus as set forth in claim 1, wherein each of said pulleys has V-shaped races covered with a material having a relatively high co-efficient of friction.

18. Apparatus as set forth in claim 17, wherein said material is rubber.

19. Apparatus as set forth in claim 1, further comprising means adjacent to the peripheries of at least one of said pulleys for engaging and pushing said cable into the races thereof.

20. Apparatus as set forth in claim 19, wherein said means comprises rotatable wheels with peripheral tires mounted with their planes of rotation substantially parallel to the plane of rotation of the pulley adjacent thereto.

21. Apparatus as set forth in claim 20, wherein said wheels are mounted in pairs on pairs of crossed arms which are pivotally interconnected and mounted where they cross.

22. Apparatus as set forth in claim 21, further comprising resilient means interconnecting said arms for urging the wheels on said arms toward each other.

23. Apparatus as set forth in claim 22, wherein said wheels and said arms are mounted in an arc adjacent said second pulley and further comprising adjusting means for adjusting the mounting of said arms radially of the axis of said second pulley.

24. Apparatus as set forth in claim 1, further comprising a pair of second braking means, each of said second braking means being hand operable and being connected to brake one of said pulleys.

* * * * *